April 9, 1935.      H. H. TIMIAN      1,996,939
ENGINE
Filed Sept. 2, 1932      2 Sheets-Sheet 1
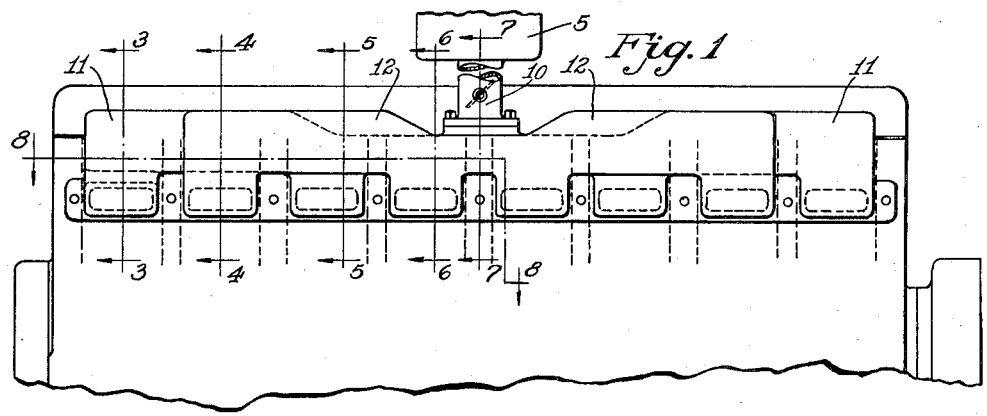
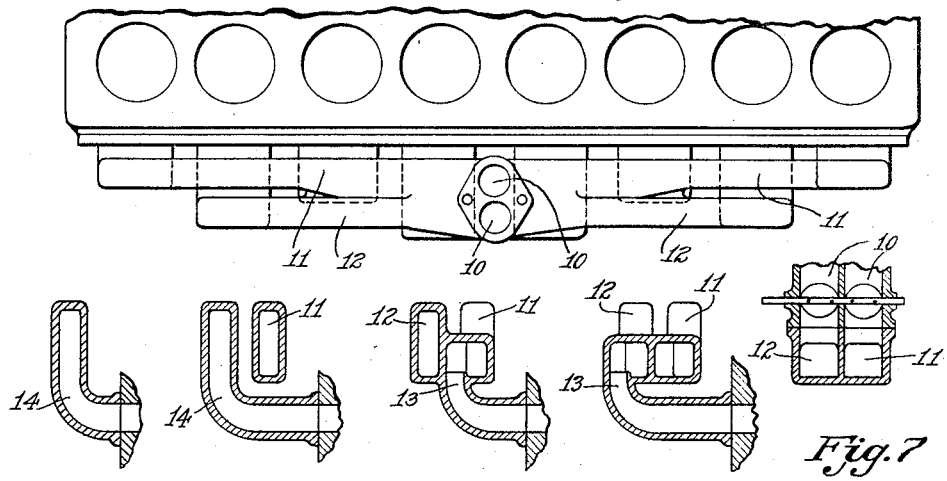
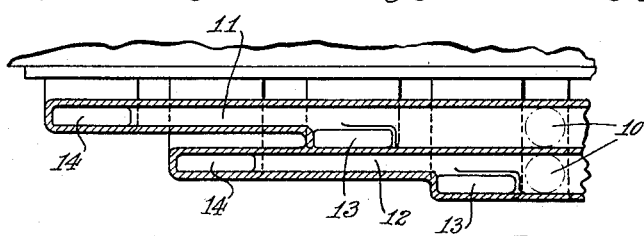
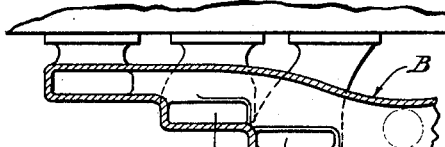
INVENTOR.
Harold H. Timian
BY
ATTORNEY.

April 9, 1935.  H. H. TIMIAN  1,996,939
ENGINE
Filed Sept. 2, 1932   2 Sheets-Sheet 2

INVENTOR.
Harold H. Timian
BY
ATTORNEY.

Patented Apr. 9, 1935

1,996,939

UNITED STATES PATENT OFFICE 1,996,939

ENGINE

Harold H. Timian, Detroit, Mich., assignor to Continental Motors Corporation, Detroit, Mich., a corporation of Virginia Application September 2, 1932, Serial No. 631,457

14 Claims. (Cl. 123—52)

My invention relates to engines and more particularly to intake manifolds for distributing combustible mixtures to the engine cylinders.

Eight cylinder engines have become quite popular within the last few years and it has become quite general throughout the industry to construct cars of the medium priced field with eight cylinder engines, four and six cylinders are generally employed in cars classified in the low price field whereas large eights and twelves and in a few instances 16 cylinder engines are employed in cars classified in the high price field. Although the principles of my invention may be advantageously incorporated in engines other than those of the eight cylinder type, it is with special reference to eight cylinder-in-line engines that the present invention was developed.

An object of my present invention is to construct an engine of the multi-cylinder-in-line type having an improved operating performance by providing an intake manifold structure therefor whereby to more uniformly distribute the fuel to the engine cylinders.

More particularly, another object of my present invention is to construct an intake manifold structure for a multi-cylinder internal combustion engine in which the liquid fuel precipitate is uniformly distributed to the engine cylinders.

A further object of my invention is to provide an intake manifold in which a minimum of floor area is provided for collecting liquid fuel precipitates, whereby to obtain adequate straightening of the fuel flow without the accumulation of an excessive amount of liquid fuel precipitate in the port runners whereby to provide for an improved engine performance when accelerating the engine.

For a further detailed understanding of my invention, reference may be had to the accompanying drawings illustrating preferred embodiments of my invention, and in which:

Fig. 1 is a fragmentary side elevational view of an engine showing an intake manifold constructed in accordance with my invention.

Figure 10:
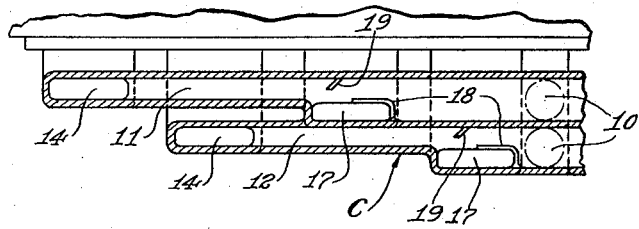

Fig. 2 is a plan view of the engine with the cylinder head removed showing the manifold in plan, Fig. 3 is a detail sectional view on the line 3—3 of Fig. 1, Fig. 4 is a detail sectional view on the line 4—4 of Fig. 1, Fig. 5 is a detail sectional view on the line 5—5 of Fig. 1, Fig. 6 is a detail sectional view on the line 6—6 of Fig. 1, Fig. 7 is a detail sectional view on the line 7—7 of Fig. 1, Fig. 8 is a horizontal sectional view through the manifold taken on the line 8—8 of Fig. 1, Fig. 9 is a horizontal fragmentary sectional view of a modified construction, particularly illustrating my invention associated with a manifold adapted for use with a six-cylinder engine, Fig. 10 is a fragmentary sectional view of a modified construction illustrating two cooperating types of liquid fuel distributing means.

Figure 11:
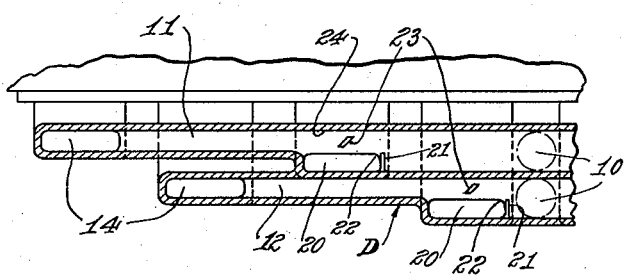
Figure 12:
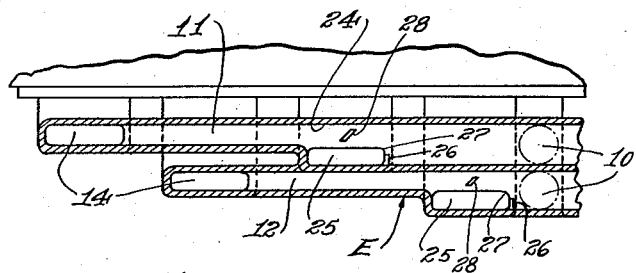
Figure 14:
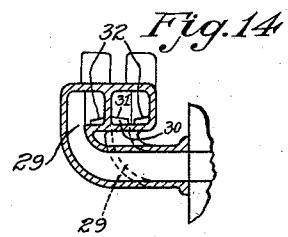
Figure 13:
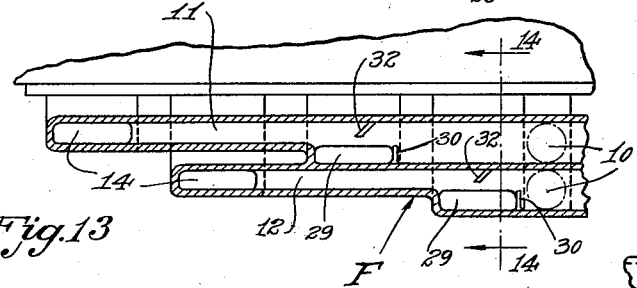
Figure 16:
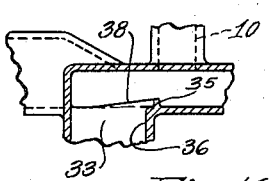
Figure 15:
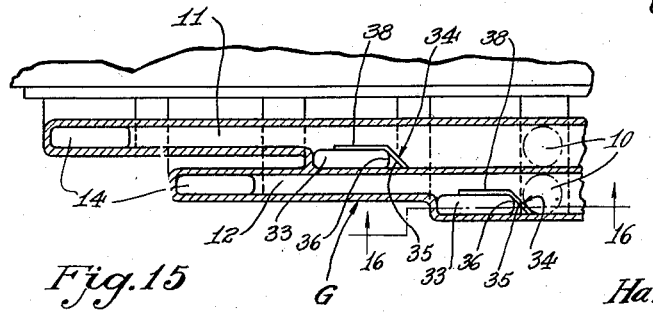

Fig. 11 is a similar sectional view illustrating another modification of the liquid fuel distributing means, Fig. 12 is a similar sectional view illustrating another modified form of construction, Fig. 13 is a similar sectional view illustrating a further modified form of construction, Fig. 14 is a transverse sectional view taken on the line 14—14 of Fig. 13, Fig. 15 is a fragmentary horizontal sectional view illustrating a still further modified form of construction, and Fig. 16 is a sectional view taken substantially on the line 16—16 of Fig. 15.

In the application of my invention to an internal combustion engine, I preferably illustrate the same in connection with a multi-cylinder engine of the eight cylinder-in-line type, though it will be apparent as the description progresses that my invention may be adapted to engines other than those of the eight cylinder in line type. My invention offers a satisfactory solution to the difficult problem of distributing fuel mixture to an eight cylinder engine and provides means for individually conducting fuel mixture to the several engine cylinders.

The intake manifold herein illustrated is preferably of the downdraft type although it is obvious that the principles of my invention may be employed in manifolds other than those of the downdraft type if so desired. The present manifold provides a primary fuel mixture conducting means 10 which is adapted for connection with the engine carburetor 5 of the usual type. In the present instance, I have preferably provided a manifold having dual riser portions which is preferably adapted for assembly with a dual carburetor 5 of the usual type. In the present instance, I have preferably provided a manifold having dual riser portions which is preferably adapted for assembly with a dual carburetor though it will be understood that I do not necessarily limit my invention to a manifold of this particular type. The manifold structure includes a pair of oppositely extending inner and outer lateral fuel mixture conducting portions respectively designated by the reference characters 11 and 12. These conducting portions preferably extend substantially in a horizontal plane longitudinally of the engine and an understanding of the invention will be apparent following a detailed description of one of these lateral fuel mixture conducting portions and associated structure.

The fuel mixture conducting portion is provided with a plurality of openings in the floor thereof for passing the fuel mixture downwardly from the conducting portion to the engine cylinders, and preferably a port runner is connected with each of said openings, the port runner extending downwardly from the opening and thence inwardly toward the engine block. (Figs. 3 to 6 particularly illustrate the runner construction.)

Referring to Figs. 1 and 8, it will be noted that the lateral fuel mixture conducting portion adjacent the primary fuel mixture conduction portion is substantially square in cross-section (see also Figs. 5 to 7 inclusive). An intermediate portion of the lateral conducting portion is provided with an opening 13 and the opening 14 is preferably located adjacent the extreme end thereof. These openings are thus spaced longitudinally of the fuel mixture conducting portion and as shown in Fig. 8 it will be noted that said openings are also spaced transversely thereof. That portion of the fuel mixture conducting portion beyond the intermediate opening 13 is preferably rectangular in cross section and is provided with a height substantially twice the width (see detailed sections) whereby to provide substantially the same surface area within the end portion of the conducting portion as the substantially square section between the intermediate opening 14 and primary fuel mixture conducting portion 10. The cross sectional area of the conducting portion substantially remains the same throughout its length irrespective of the particular shape or contour of the conducting portion, thus the rectangular area is substantially equal to the square area whereby to maintain substantially the same velocities throughout the fuel mixture conducting portion. It will be noted that these openings 13 and 14 are preferably elongated in a direction longitudinally of the conducting portion and it may be also noted that opening 13 occupies a position to one side of the longitudinal axis of the conducting portion while opening 14 occupies a position to the other side of the longitudinal axis of said conducting portion and thus these openings are each located for intercepting half the liquid precipitate which is flowing along the floor of said conducting portion.

Theoretically these openings would seem to each receive half the total precipitate flowing along the floor of the manifold conducting portion but practical experience has shown that the intermediate opening tends to receive more than half of the precipitant as the liquid will flow over the side edge of the opening instead of continuing onwardly towards the opening more remote from the primary fuel mixture conducting portion 10.

The practical application of a manifold of this type to a multi-cylinder engine depends largely on the proper control of liquid fuel distribution. Such a control is essential for obtaining an efficient engine performance at all engine speeds and in the present embodiment of my invention, I preferably control liquid fuel distribution by means of dams or weirs associated with said openings and cooperating therewith to uniformly distribute said liquid fuel. In the construction shown in Fig. 8 I have provided a liquid fuel distribution control means consisting of a dam that extends adjacent to the edge of the opening and preferably flush therewith, said dam extending upwardly from the floor of the conducting portion to a height as preferably determined by experiment. The dam surrounding the edge of the opening controls the amount of liquid that will overflow or drop through the opening and in the preferred construction herein illustrated, I find that satisfactory distribution may be obtained by a dam which extends transversely of the conducting portion adjacent one end of the opening and partially down one side of said opening. In a manifold B as illustrated in Fig. 9, which is especially adapted for a six cylinder engine, I preferably provide a dam for cooperative association with each of the intermediate openings 15 and 16 respectively. In this instance, I find it necessary to provide dams of different length for said openings and to broadly illustrate the principle involved, I have shown the dam associated with the opening 15 as extending the full length of the opening whereas the dam associated with opening 16 extends only part way down the side of the opening as is the case with the dams in Fig. 8. This construction will uniformly distribute the liquid fuel precipitate that is caused to flow longitudinally of the conducting portion and the height and length of said dams may be varied in various types of engines in accordance with the principles described above.

The contour, height and structure, as well as the location of these dams may be varied within wide limits and additional baffles or obstructions may be cooperatively associated therewith for effecting further control of the liquid fuel distribution. Figs. 10 to 16 inclusive illustrate in more detail the various possibilities. In Fig. 10 I have illustrated a modified construction in which the manifold structure C is provided with an intermediate opening 17 having a dam 18 associated therewith and extending substantially flush with the edges of said opening. This dam 18 is preferably constructed substantially like the dams in Figs. 8 and 9 and to effect a refinement of the liquid fuel distribution, I may incorporate a dam 19 located within the conducting portion and preferably spaced from the opening 17. This dam extends transversely of the conducting portion and is preferably obliquely positioned with respect to the longitudinal axis of the conducting portion and the relative position of the same may be varied as desired. The position of the dam 19 shown in Fig. 10 is directly opposite that portion of the opening 17 in which no side dam is located and the exact location of the dam 19 may be varied within certain limits depending upon the conditions of fuel flow and the type of engine with which said manifold is employed. I find however, that the exact position and size of these dams may best be determined by experiment.

In Fig. 11 I have illustrated a manifold structure D having an intermediate opening 20, a weir or dam 21 adjacent one end of the opening and preferably terminating at the corner 22. In this showing I have provided a dam 23 in the conducting portion which is spaced from the inner wall thereof thereby providing a baffle in the form of an island projecting from the floor of said conducting portion, this baffle or dam 23 being preferably located as shown to obtain the desired liquid fuel distribution, but obviously the relative position of this dam with respect to the opening, may be varied depending upon the conditions of fuel flow and the type of engine with which the manifold is to be used.

In the construction shown in Fig. 12, I have provided a manifold structure E having an intermediate opening 25 and an associate dam structure 26 that terminates short of the corner 27 of the opening 25. I have also shown a dam 28 of the general type as illustrated in Fig. 11 which cooperates with the opening and with the dam 26 to provide efficient and uniform distribution of the liquid fuel. It will also be apparent that the exact size and contour of these dams as well as the particular location of same may be varied as desired, the exact positioning and dimensions of the dams being preferably determined by experiment.

In Fig. 13 I have shown a further modification of my invention in which a manifold structure F having an intermediate opening 29 is provided with a dam 30 adjacent the end of the opening, this dam 30 having an inclined upper edge 31 as shown in the detailed sectional view 14. The dam 32 may be also employed to provide for a further refinement in the liquid fuel distribution and as shown in the present figure this dam 32 is of the general type as dam 19 shown in Fig. 10.

It will be obvious that the exact location and dimensions of the dams shown in this figure may be varied within certain prescribed limits as best determined by experiment.

In Fig. 15 I have shown a still further modification in which a manifold structure G having an intermediate opening 33 is provided with a dam structure 34 consisting of a portion 35 adjacent one end of the opening 33 which extends obliquely to the edge 36 of the opening and to the outer wall 37 of the conducting portion. In this modification I have also shown the dam 34 as including a portion 38 extending adjacent the side edge of the opening 33, this portion 38 being preferably constructed to provide a top edge which slopes with respect to the floor of the conducting portion (see Fig. 16). In this construction I have chosen to omit the assembly of an additional dam within the conducting portion, but if desired, such dam as shown in Figs. 10 to 13 and respectively numbered 19, 23, 28 and 32 may be incorporated with the construction shown in Fig. 15.

I desire it to be understood that I contemplate the use of dams adjacent the opening of various heights and dimensions of various contours and lengths with or without other cooperating dams which are preferably located in spaced relation with the opening. My experience in manifold engineering and design has shown that it is very difficult to theoretically compute the exact size and location of these dams for obtaining liquid fuel distribution. I find that with various types of engines the conditions of fuel flow will vary, the size and contour of the manifold will also vary the conditions of fuel flow and many other factors will vary the conditions found to be present in the manifold. It has therefore been found advisable to determine the positioning and dimensions of such baffles or dams by experiment and the various constructions shown in the accompanying drawings illustrate various types of baffles and dams which may be employed. The particular arrangement and combination illustrated in Figs. 10 to 16 may be changed or varied within certain limits and the baffles and dams as herein shown may be combined in various ways, to wit: the baffle 18 of Fig. 10 may, if desired, be combined with the baffle 23 of Fig. 11 or the baffles 30 and 34 respectively shown in Figs. 13 and 15 may be combined with baffles of the general type as shown in Figs. 10 and 11 and designated respectively as 19 and 23.

It will thus be apparent that I have provided a simple means for controlling liquid fuel distribution, the said baffles and dams controlling the quantity and richness of the charge distributed to the engine cylinders by means of the port runners which connect each of said openings with the engine.

It will be noted that each cylinder charge is conducted downwardly from the conducting portion through one of the openings and thence through the port runner associated therewith to the engine. The length of these port runners should be sufficient to straighten out the fuel flow and by constructing a portion of the port runner to extend, in a plane transversely to the horizontal plane, it will be noted that this portion of the port runner will accumulate a minimum of fuel precipitates, as any fuel which tends to collect thereon will flow by gravity to the lowest portion of the port runner which is that portion lying in a horizontal plane preferably adjacent the intake ports of the engine. This construction therefore provides a minimum of floor area lying in a horizontal plane and thereby the engine performance in acceleration is materially improved. In other words, it will be seen that I have provided a manifold structure in which the fuel conducting portions lie in different planes, the laterally conducting portions being shown as lying in a horizontal plane and a portion of the port runner conducting portions lying in a vertical plane.

It will be apparent to those skilled in the art to which my invention pertains, that various modifications and changes may be made therein without departing from the spirit of my invention or from the scope of the appended claims.

What I claim as my invention is:

1. An intake manifold structure for a multicylinder engine including a fuel mixture conducting portion having end and intermediate openings in the floor of said portion and spaced longitudinally thereof for passing the fuel mixture downwardly from said conducting portion to the engine, said conducting portion having liquid fuel distributing means carried by said floor adjacent to some of said openings and cooperating therewith.

2. An intake manifold structure for a multicylinder engine including a fuel mixture conducting portion having end and intermediate openings in the floor of said portion and spaced longitudinally thereof for passing the fuel mixture downwardly from said conducting portion to the engine, said conducting portion having a dam projecting upwardly from the floor adjacent to one of said openings and cooperating therewith to control liquid fuel distribution.

3. An intake manifold structure for a multicylinder engine including a fuel mixture conducting portion having a plurality of openings in the floor of said portion and spaced longitudinally thereof for passing the fuel mixture downwardly from said conducting portion to the engine, said conducting portion having a dam extending upwardly from the floor of said portion and substantially surrounding one of said openings whereby to control liquid fuel distribution.

4. An intake manifold structure for a multi-cylinder engine including a primary fuel mixture conducting portion and a lateral fuel mixture conducting portion extending generally longitudinally of the engine and communicating with said primary conducting portion, said lateral conducting portion having a plurality of openings in the floor of said portion for passing fuel mixture downwardly from said conducting portion to the engine, one or more of said openings being located intermediate the ends of said conducting portion, and liquid fuel distributing means cooperating with said intermediate opening or openings.

5. An intake manifold structure for a multi-cylinder engine and including a fuel mixture conducting portion extending longitudinally of the engine and having a plurality of elongated openings in the floor of said portion and spaced longitudinally thereof for passing fuel mixture generally downwardly from said portion to the engine, said openings elongated generally longitudinally of said conducting portion, said conducting portion provided with liquid fuel controlling means consisting of a dam adjacent a plurality of sides of an intermediate opening and cooperating therewith to control liquid fuel distribution substantially as described in the accompanying specification.

6. An intake manifold structure for a multi-cylinder engine including a fuel mixture conducting portion having a plurality of openings in the floor of said portion and spaced longitudinally thereof for passing fuel mixture downwardly from said conducting portion to the engine, said conducting portion having liquid distributing means cooperating with said openings and consisting of dams, some of said dams located adjacent to and substantially flush with an edge of the opening and other of said dams spaced from an edge of said opening.

7. An intake manifold structure for a multi-cylinder engine including a fuel mixture conducting portion having a plurality of openings in the floor of said portion and spaced longitudinally thereof for passing fuel mixture downwardly from said conducting portion to the engine, said conducting portion having liquid distributing means cooperating with said openings and consisting of dams, said dams located adjacent to and substantially flush with two edges of said opening.

8. An intake manifold structure for a multi-cylinder engine including a fuel mixture conducting portion having a plurality of openings in the floor of said portion and spaced longitudinally thereof for passing fuel mixture downwardly from said conducting portion to the engine, said conducting portion having liquid distributing means cooperating with said openings and consisting of dams, said dams having top edges inclined to the floor of said conducting portion.

9. An intake manifold structure for a multi-cylinder engine including a fuel mixture conducting portion having a plurality of openings in the floor of said portion and spaced longitudinally thereof for passing fuel mixture downwardly from said conducting portion to the engine, said conducting portion having liquid distributing means cooperating with said openings and consisting of dams, some of said dams extending transversely of said conducting portion and other of said dams extending generally longitudinally of said conducting portion.

10. An intake manifold structure for a multi-cylinder engine including a fuel mixture conducting portion having a plurality of openings in the floor of said portion and spaced longitudinally thereof for passing fuel mixture downwardly from said conducting portion to the engine, said conducting portion having liquid distributing means cooperating with said openings and consisting of dams, some of said dams inclined obliquely to the longitudinal axis of said conducting portion.

11. An intake manifold structure for a multi-cylinder engine including a fuel mixture conducting portion having a plurality of openings in the floor of said portion and spaced longitudinally thereof for passing fuel mixture downwardly from said conducting portion to the engine, said conducting portion having liquid distributing means cooperating with said openings and consisting of dams, some of said dams forming islands within said conducting portion and extending in general transversely of said portion.

12. An intake manifold structure for an internal combustion engine including a fuel mixture conducting portion extending substantially longitudinally of the engine and having a substantially flat floor, said conducting portion having a plurality of openings in the floor thereof for passing the fuel mixture downwardly from said portion to said engine, said openings being spaced longitudinally and transversely of said conducting portion.

13. An intake manifold structure for an internal combustion engine including a fuel mixture conducting portion extending substantially longitudinally of the engine and having a substantially flat floor, said conducting portion having a plurality of openings in the floor thereof for passing the fuel mixture downwardly from said portion to said engine, said openings being spaced transversely of said conducting portion.

14. An intake manifold structure for an internal combustion engine including a fuel mixture conducting portion extending substantially longitudinally of the engine and having a substantially flat floor, said conducting portion having a plurality of openings in the floor thereof for passing the fuel mixture downwardly from said portion to said engine, said conducting portion having end and intermediate openings in the floor thereof for passing the fuel mixture downwardly from said portion to said engine, said conducting portion extending from an intermediate opening to said end opening being relatively less in cross-sectional area than that portion of said conducting portion extending to the other side of said intermediate opening, said intermediate opening having a width less than the width of said conducting portion whereby to provide an unbroken floor portion for conducting fuel precipitate to the end opening.

HAROLD H. TIMIAN.